(12) United States Patent
Markham

(10) Patent No.: US 10,576,865 B2
(45) Date of Patent: Mar. 3, 2020

(54) LOW CENTER-OF-GRAVITY TANK TRAILER

(71) Applicant: The Modern Group, Ltd., Beaumont, TX (US)

(72) Inventor: Gary R. Markham, Lumberton, TX (US)

(73) Assignee: The Modern Group, Ltd., Beaumont, TX (US)

( * ) Notice: Subject to any disclaimer, the term of this patent is extended or adjusted under 35 U.S.C. 154(b) by 168 days.

(21) Appl. No.: 15/689,222

(22) Filed: Aug. 29, 2017

(65) Prior Publication Data

US 2019/0061597 A1    Feb. 28, 2019

(51) Int. Cl.
*B60P 3/22*     (2006.01)
*B62D 21/20*    (2006.01)
*B62D 53/06*    (2006.01)

(52) U.S. Cl.
CPC ............ *B60P 3/2205* (2013.01); *B62D 21/20* (2013.01); *B62D 53/06* (2013.01)

(58) Field of Classification Search
CPC ................................ B60P 3/2205; B60P 3/22
See application file for complete search history.

(56) References Cited

U.S. PATENT DOCUMENTS

| | | | |
|---|---|---|---|
| 814,880 A | 3/1906 | Small et al. | |
| RE20,038 E | * 7/1936 | Thwaits | B60P 3/2265 280/837 |
| 2,163,387 A | * 6/1939 | Thwaits | B60P 3/221 220/653 |
| 2,223,571 A | * 12/1940 | Meyer | B60P 3/221 280/837 |
| 2,239,442 A | * 4/1941 | Gredell | B60P 3/2205 280/837 |
| D170,969 S | * 12/1953 | Clough | D12/95 |
| 3,081,104 A | * 3/1963 | Schmiermann | B60P 3/2205 280/837 |

(Continued)

FOREIGN PATENT DOCUMENTS

| CN | 203682091 U | 7/2014 |
|---|---|---|
| CN | 203682272 U | 7/2014 |
| CN | 203682275 U | 7/2014 |

*Primary Examiner* — Anne Marie M Boehler
*Assistant Examiner* — Michael R Stabley
(74) *Attorney, Agent, or Firm* — Howard L. Speight, PLLC

(57) ABSTRACT

A tank trailer includes front, rear, and transition sections. The front section has a front frame having a front-frame front end, which is at a front-frame height above a surface upon which the tank trailer rests, and a front-frame rear end. The front section includes a cylindrical front barrel coupled to the front frame and having a front-barrel diameter and a front barrel length. The rear section has a rear frame having a rear-frame front end and a rear-frame rear end, which is at a rear-frame height above the surface, and a cylindrical rear barrel coupled to the rear frame, which has a rear-barrel diameter and a rear barrel length. The transition section includes a cylindrical transition barrel coupled to the front barrel and to the rear barrel and a transition-barrel diameter and a transition-barrel length along a transition-barrel height. The front-barrel diameter is the same as the rear-barrel diameter.

19 Claims, 4 Drawing Sheets

(56) References Cited

U.S. PATENT DOCUMENTS

| | | | | |
|---|---|---|---|---|
| 3,277,843 | A | * | 10/1966 | Horner .................... B61D 5/06 105/360 |
| 3,318,485 | A | * | 5/1967 | Landeborg ........... B65D 88/548 222/136 |
| 3,474,740 | A | * | 10/1969 | Varnes .................... B61D 5/06 105/360 |
| 3,557,708 | A | * | 1/1971 | Bolte ....................... B61D 3/10 105/3 |
| 3,712,250 | A | * | 1/1973 | Geyer .................... B61D 5/06 105/360 |
| 8,523,232 | B2 | | 9/2013 | DeLaRosa et al. |
| 8,801,040 | B2 | | 8/2014 | Thomas et al. |
| 2011/0148090 | A1 | | 6/2011 | DeleRosa et al. |

* cited by examiner

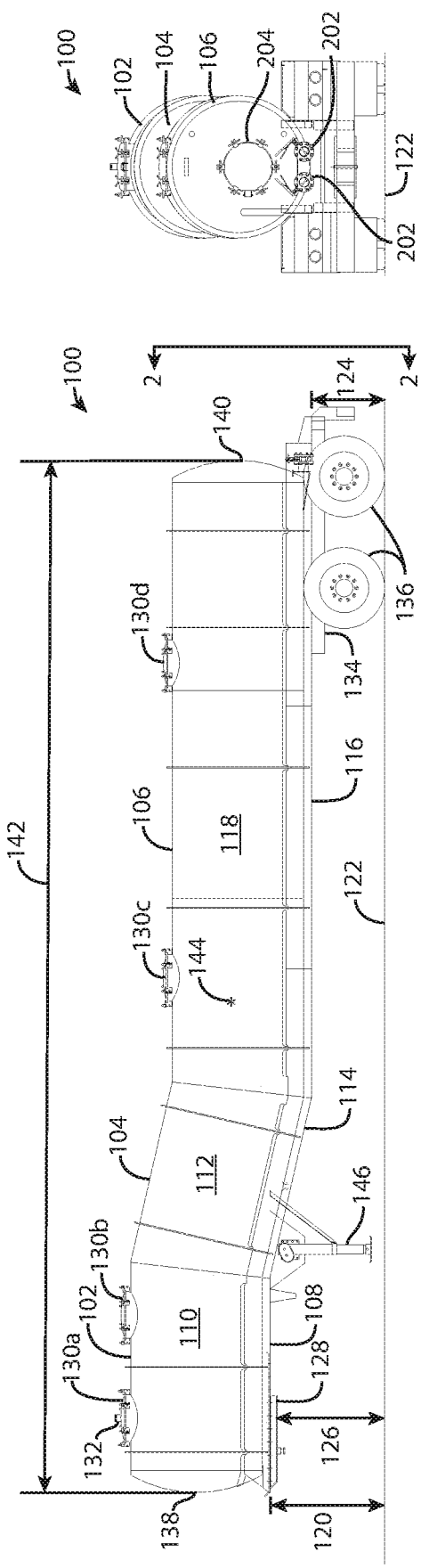
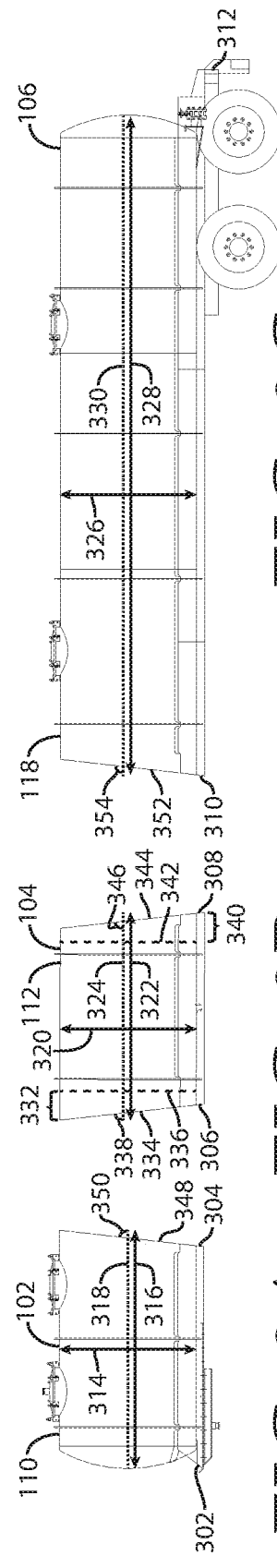
FIG. 1
FIG. 2
FIG. 3A  FIG. 3B  FIG. 3C

LOW CENTER-OF-GRAVITY TANK TRAILER

BACKGROUND

Tank trailers have been used to transport liquids and other flowable materials for many years with few changes in basic design. There are two basic types of tank trailers: the linear tube, tubular, or straight bore trailer and the conical trailer. In both types, the front of the trailer is set at a height, the "king pin" height, that is determined by the height of the fifth wheel in the truck used to transport the trailer, typically 49 inches. The back of the trailer is typically set to a height of 43 inches to provide 6 inches of pitch from the front to the back of the trailer. A tank is typically mounted on the trailer. Safety is a major concern with tank trailers. One safety issue with tank trailers is their tendency to overturn. One of the most significant contributors to this tendency is the high center of gravity that tank trailers typically have. Improving the safety of tank trailers by lowering their center of gravity is a challenge.

BRIEF DESCRIPTION OF THE DRAWINGS

FIG. 1 is a driver's side view of a low center-of-gravity trailer.

FIG. 2 is a rear view of the low center-of-gravity trailer of FIG. 1.

FIG. 3A is a driver's side view of a front section of the low center-of-gravity tank trailer of FIG. 1.

FIG. 3B is a driver's side view of a transition section of the low center-of-gravity tank trailer of FIG. 1.

FIG. 3C is a driver's side view of a rear section of the low center-of-gravity tank trailer of FIG. 1.

DETAILED DESCRIPTION

Figure 4:
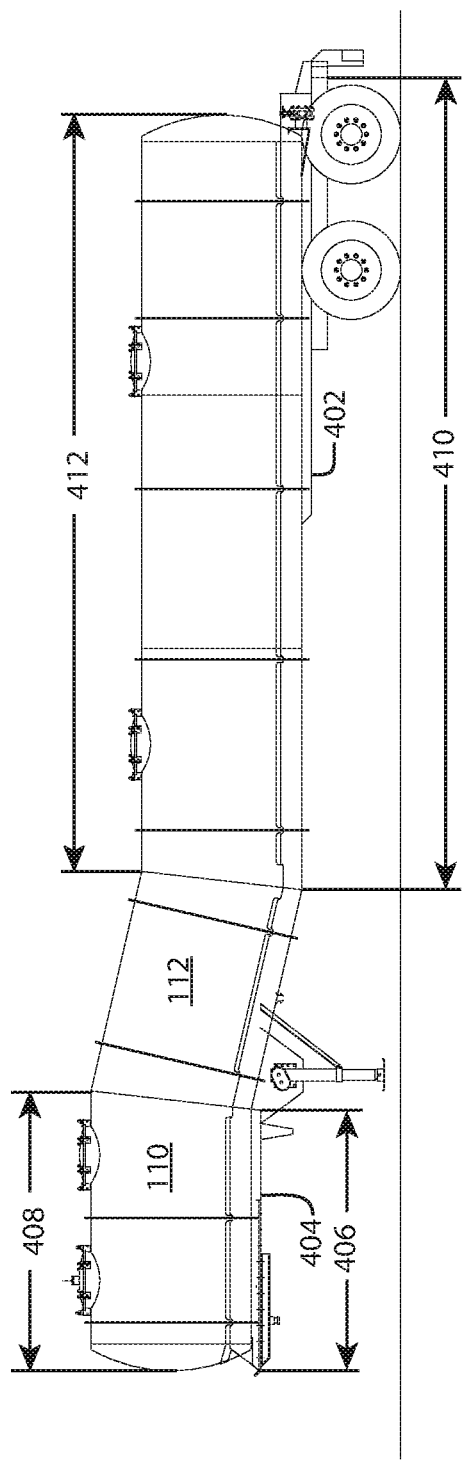
FIG. 4 is a driver's side view of a low center-of-gravity trailer with a segmented frame.

The following detailed description illustrates embodiments of the present disclosure. These embodiments are described in sufficient detail to enable a person of ordinary skill in the art to practice these embodiments without undue experimentation. It should be understood, however, that the embodiments and examples described herein are given by way of illustration only, and not by way of limitation. Various substitutions, modifications, additions, and rearrangements may be made that remain potential applications of the disclosed techniques. Therefore, the description that follows is not to be taken as limiting on the scope of the appended claims. In particular, an element associated with a particular embodiment should not be limited to association with that particular embodiment but should be assumed to be capable of association with any embodiment discussed herein.

FIG. 1 is a driver's side view of a low center-of-gravity trailer. FIG. 2 is a rear view of the low center-of-gravity trailer of FIG. 1. FIG. 3A is a driver's side view of a front section of the low center-of-gravity tank trailer of FIG. 1. FIG. 3B is a driver's side view of a transition section of the low center-of-gravity tank trailer of FIG. 1. FIG. 3C is a driver's side view of a rear section of the low center-of-gravity tank trailer of FIG. 1.

A low center-of-gravity (CG) trailer 100 includes a front section 102, a transition section 104, and a rear section 106. The front section 102 includes a front frame 108 and a cylindrical front barrel 110. The transition section 104 includes a cylindrical transition barrel 112 and, in one or more embodiments, a transition frame 114. In some embodiments, such as the embodiment discussed below in connection with FIG. 4, the transition section 104 does not include the transition frame 114. The rear section 106 includes a rear frame 116 and a cylindrical rear barrel 118. In one or more embodiments, the transition frame 114 is coupled, e.g., by welding, to the front frame 108 and to the rear frame 116. In one or more embodiments, the transition barrel 112 is coupled, e.g., by welding, to the front barrel 110 and to the rear barrel 118.

As can be seen, the front frame 108 is at a front-frame height 120, in one embodiment 52 inches, above a surface 122 that is greater than the rear-frame height 124, in one embodiment 33 inches, above the surface 122. The transition section 104 provides the transition between the front-frame height 120 and the rear-frame height 124. Note that the king-pin height 126, i.e., the height to a king-pin plate 128, is the standard 49 inches.

The front section 102 includes a first manway 130a and a second manway 130b. The first manway 130a is equipped with a vacuum fixture 132 by which a vacuum pump (not shown) can be attached to assist in vacuum loading or unloading the low CG trailer 100.

The rear section 106 includes a third manway 130c and a fourth manway 130d. Any combination of the manways 130a, 130b, 130c, 130d can be used to top load the low CG trailer 100.

A suspension box 134 and wheels 136 are sized to keep the rear section 106 close to the surface 122. The rear section 106 includes fixtures 202 by which the low CG trailer 100 can be vacuum loaded or unloaded and a clean out port 204 (only labeled in FIG. 2) by which the interior of the low CG trailer 100 can be accessed and cleaned.

The front frame 108 has a front-frame front end 302 and a front-frame rear end 304 (FIG. 3A). The transition frame has a transition-frame front end 306 and a transition-frame rear end 308 (FIG. 3B). The rear frame has a rear-frame front end 310 and a rear-frame rear end 312 (FIG. 3C).

The front barrel 110 has a front-barrel diameter 314 and a front-barrel length 316 along a front-barrel height 318. The transition barrel 112 has a transition-barrel diameter 320 and a transition-barrel length 322 along a transition-barrel height 324. The rear barrel 118 has a rear-barrel diameter 326 and a rear-barrel length 328 along a rear-barrel height 330. The front-barrel diameter 314 and the rear-barrel diameter 326 are equal within a tolerance of 1 inch in one or more embodiments, 0.5 inches in one or more embodiments, and 0.25 inches in one or more embodiments. The transition-barrel diameter 320 is equal to the front-barrel diameter 314 and the rear-barrel diameter within a tolerance of 1 inch in one or more embodiments, 0.5 inches in one or more embodiments, and 0.25 inches in one or more embodiments.

The tank trailer has a front end 138, a rear end 140, and a length 142. The length 142 is the distance from the front end 138 to the rear end 140. A horizontal coordinate of a center of gravity 144 of the front barrel 110, transition barrel 112, and rear barrel 118, assuming a uniform distribution of weight of the material used to build the barrels and that the barrels are empty or uniformly filled and ignoring the weight of the non-barrel components of the low CG trailer 100, is located one-half of the length 142 of the tank trailer behind the front end 138 of the tank trailer plus or minus in one embodiment 1 percent of the length 142 of the low CG trailer 100, in one embodiment 0.5 percent of the length 142 of the low CG trailer 100, in one embodiment 0.1 percent of the length 142 of the low CG trailer 100.

In one or more embodiments, the transition section 104 has a front transition sub-section 332 having a shape of a cylinder having a front end 334 and a back end 336. The front end 334 is at an acute transition-non-right angle 338 (90-β) to the transition-barrel height 324 and is coupled to the cylindrical front barrel 110. The back end 336 is at a right angle to the transition-barrel height 324 and is coupled to the cylindrical transition barrel 112.

In one or more embodiments, the transition section 104 has a rear transition sub-section 340 having a shape of a cylinder having a front end 342 and a back end 344. The back end 344 is at an acute transition-non-right angle 346 (90-β) to the transition-barrel height 324, which is the same as the acute transition-non-right angle 338, and is coupled to the cylindrical rear barrel 118. The front end 342 is at a right angle to the transition barrel height 324 and is coupled to the cylindrical transition barrel 112.

In one or more embodiments, the front barrel 110 has a front-barrel rear end 348 that is an acute front-non-right angle 350 (90-α) to the front-barrel height 318. In one or more embodiments, the acute front-non-right angle 350 is the same as the acute transition-non-right angle 338.

In one or more embodiments, the rear barrel 118 has a rear-barrel front end 352 that is an acute rear-non-right angle 354 (90-α) to the rear-barrel height 330. In one or more embodiments, the acute rear-non-right angle 354 is the same as the acute transition-non-right angle 338.

In one or more embodiments, a vertical coordinate of the center of gravity 144 of the tank trailer is located at approximately (i.e., in one or more embodiments, within 0.05 A, in one or more embodiments, within 0.025 A, in one or more embodiments, within 0.01 A) (the following equation assumes that a uniform distribution of weight of the material used to build the tank trailer and that the tank trailer is empty or uniformly filled; the following equation ignores any pitch in the front section and the rear section and the contribution of the weight of the wedge shaped areas delineated by the front-barrel rear end 348, the front transition sub-section front end 334, the rear transition sub-section back end 344, and the rear-barrel front end 352):

$$cg = \frac{CF + CT + CR}{A(LF + LR + LT)}$$

where:

$$CF = \text{contribution of front section} = (A \cdot LF)\left(S + \frac{A}{2}\right),$$

$$CT = \text{contribution of transition section} = (A \cdot LT)\left[\begin{array}{c}\left(\frac{LT}{2}\sin(\alpha+\beta)\right)+\\ \left(S+\frac{A}{2}\right)\cos(\alpha+\beta)\end{array}\right],$$

$CR = \text{contribution of rear section} =$ $$(A \cdot LR)\left(S + \frac{A}{2} - (LT + A\tan\beta)\sin(\alpha+\beta)\right).$$

where:

LF is the front-barrel length 316 (in one or more embodiments LF=95 inches), LR is the rear-barrel length 328 (in one or more embodiments LR=280.5 inches), LT is the transition-barrel length 322 (in one or more embodiments LT=78 inches), S=the front-frame height 120 (in one or more embodiments S=52 inches), and A=the front-barrel diameter 314=the rear-barrel diameter 326=the transition-barrel diameter 320 (in one or more embodiments A=60 inches).

In one or more embodiments, α=β=6.5 degrees.

With the specifications listed above, which are merely non-limiting example specifications, the center of gravity drops from approximately 79 inches ((52 (height of king-pin plate 128 above the surface)+46 (6 inch pitch))/2+30 (A/2)) above the surface 122 with a straight tube to approximately 76.4 inches above the surface 122 with the configuration shown in FIG. 1.

The front barrel 110 has a front-barrel inside diameter and a top of the front-barrel inside diameter. The rear barrel 118 has a rear-barrel inside diameter and a top of the rear-barrel inside diameter. The top of the front-barrel inside diameter is at a greater distance from the surface 122 than the top of the rear-barrel inside diameter by, in one or more embodiments, at least 30 percent of the front-barrel diameter 314, in one or more embodiments, at least 20 percent of the front-barrel diameter 314, in one or more embodiments, at least 10 percent of the front-barrel diameter 314.

The front-barrel length 316 is the smallest that can be achieved while providing a swing clearance around the king pin and while using standard sheet metal widths to construct the front barrel 110.

A landing gear 146 may be coupled to a combination of the front frame 108, the transition frame 114, the front barrel 110, and the transition barrel 112.

FIG. 4 is a driver's side view of a low center-of-gravity trailer with a segmented frame. In one or more embodiments, the frame (made up of the front frame 108, the transition frame 114, and the rear frame 116 for the "full frame" version shown in FIG. 1) is segmented. That is, the frame is not continuous from near the front end 138 of the trailer to the rear end 140 of the trailer. For example, in FIG. 4, the transition frame has been eliminated entirely and the rear frame 402 is shorter than the rear frame 116 shown in FIG. 1.

In one or more embodiments, the front frame 404 has a front-frame length 406 that is greater than ¼ the front-barrel length 408 and less than ¾ the front-barrel length 408.

In one or more embodiments, the rear frame 402 has a rear-frame length 410 that is greater than ¼ the rear-barrel length 412 and less than ¾ the rear-barrel length 412.

In one or more embodiments (not shown), the transition frame 114 has a transition-frame length that is greater than ¼ the transition-barrel length 322 and less than ¾ the transition-barrel length 322.

Figure 5:
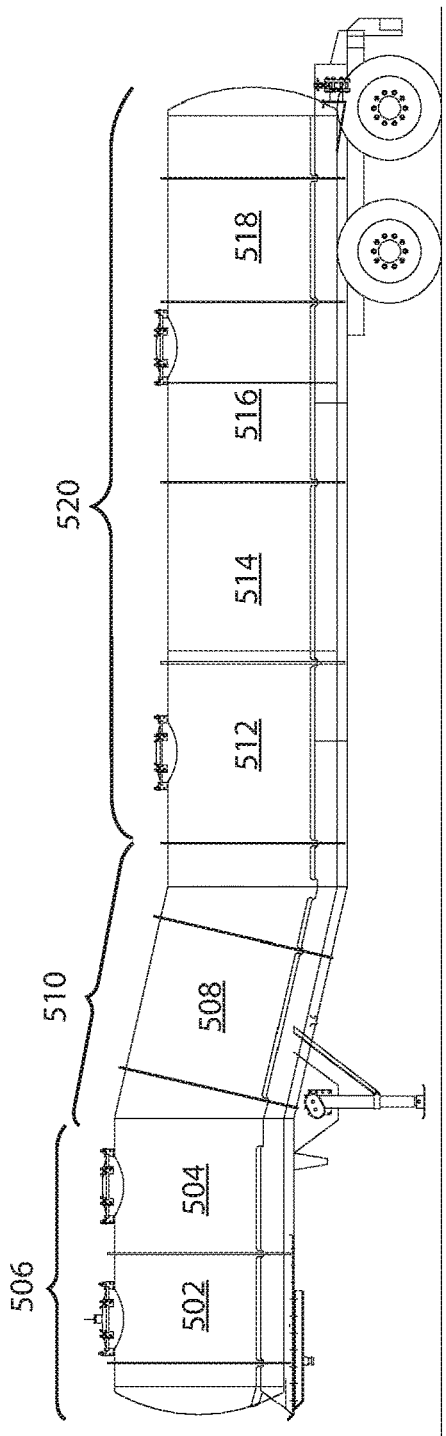
FIG. 5 is a driver's side view of a low center-of-gravity trailer in which the change in height from the front end of the trailer to the back end of the trailer is achieved by a transition section.
Figures 6A, 6B, 6C:
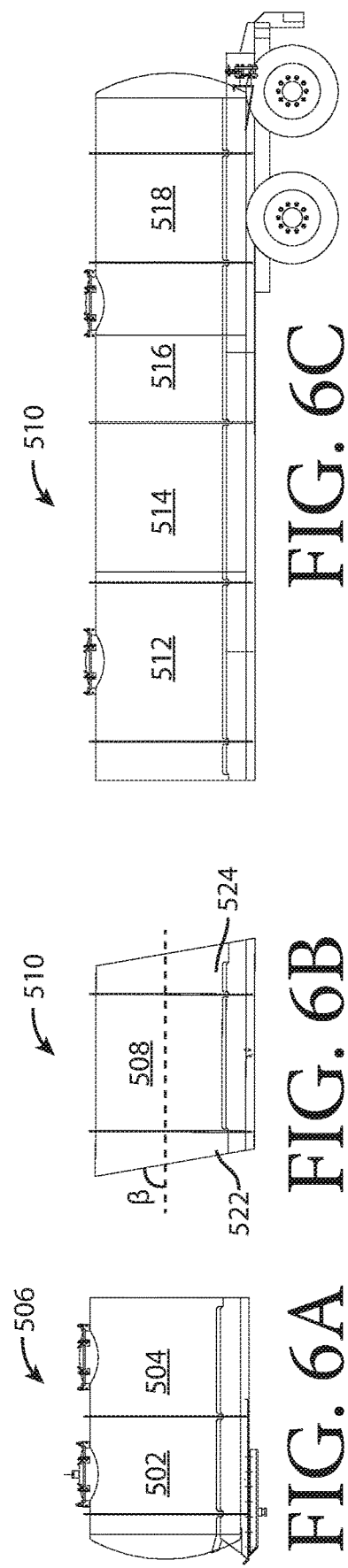
FIG. 6A is a driver's side view of the front section of the low center-of-gravity trailer of FIG. 5.
FIG. 6B is a driver's side view of the transition section of the low center-of-gravity trailer of FIG. 5.
FIG. 6C is a driver's side view of the rear section of the low center-of-gravity trailer of FIG. 5.

FIG. 5 is a driver's side view of a low center-of-gravity trailer in which the change in height from the front end of the trailer to the back end of the trailer is achieved by a transition section. FIG. 6A is a driver's side view of the front section of the low center-of-gravity trailer of FIG. 5. FIG. 6B is a driver's side view of the transition section of the low center-of-gravity trailer of FIG. 5. FIG. 6C is a driver's side view of the rear section of the low center-of-gravity trailer of FIG. 5. In one or more embodiments, rather than have the change in height from the front end 138 of the trailer to the rear end 140 of the trailer take place partially in the front section 102, partially in the transition section 104, and partially in the rear section 106, resulting in the slanted front-barrel rear end 348 and the slanted rear-barrel front end 352, the slant on the front-transition sub-section front end 334 and the slant on the rear transition sub-section back end 344 so that the "cans" 502, 504 of the front section 506, the can 508 of a transition section 510, and the cans 512, 514, 516, 518 of a rear section 520 can be manufactured from standard stock materials.

As can be seen, the angular transition from the front section 506 to the rear section 520 is achieved in the front sub-section 522 of the transition section 510 and in the rear sub-section 524 of the transition section 510.

Figure 7:
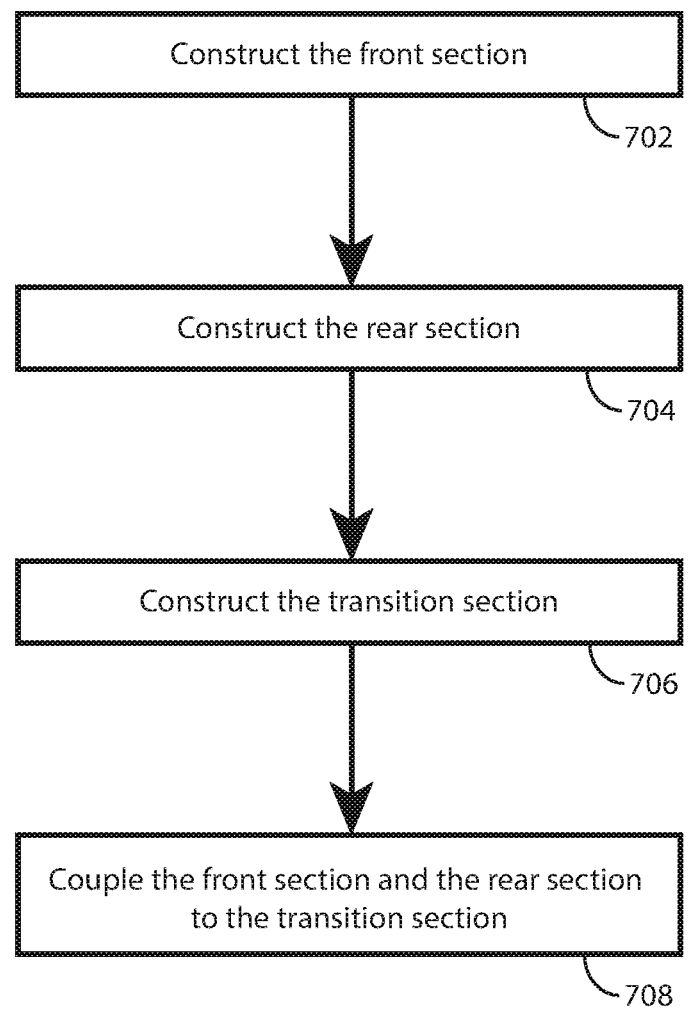
FIG. 7 is a flow chart showing the construction of a low center-of-gravity trailer.

FIG. 7 is a flow chart showing the construction of a low CG trailer 100. In one more embodiments, the front section 102 is constructed (block 702) by manufacturing the front frame 108 having the front-frame front end 302 and the front-frame rear end 304. The front-frame front end 302 is designed to be at the front-frame height 120 above the surface 122 upon which the low CG trailer 100 rests. The front frame 108 can be a full or partial frame, as discussed above. The cylindrical front barrel 110 is manufactured to having the front-barrel diameter 314 and the front barrel length 318. The front to barrel 110 is coupled to the front frame 108.

In one or more embodiments, the rear section 106 is constructed (block 704) by manufacturing the rear frame 116 having the rear-frame front end 310 and the rear-frame rear end 312. The rear-frame rear end 312 is designed to be at the rear-frame height 124 above the surface 122. The rear frame 116 can be a full or partial frame, as discussed above. The cylindrical rear barrel 118 is manufactured to have the rear-barrel diameter 326 and the rear barrel length 328. The rear barrel 118 is coupled to the rear frame 116.

In one or more embodiments, the transition section 104 is constructed (block 706) by manufacturing the cylindrical transition barrel 112 to have the transition-barrel diameter 320 and the transition-barrel length 322 along the transition-barrel height 324. The transition section 104 includes the front transition sub-section 332 and the rear transition sub-section 340.

The front transition sub-section 332 is manufactured to have the shape of a cylinder having the front end 334 and the back end 336. The front end 334 is at the acute transition-non-right angle 338 to the transition-barrel height 324 and the back end 336 is at a right angle to the transition-barrel height 324 and is coupled to the cylindrical transition barrel 112.

The rear transition sub-section 340 is manufactured to have the shape of a cylinder having the front end 342 and the back end 344. The back end 344 is at the acute transition-non-right angle 346 to the transition-barrel height 324 and the front end 342 is at a right angle to the transition-barrel height 324 and is coupled to the cylindrical transition barrel 112.

In one or more embodiments, the front barrel 110 is coupled to the front end 334 of the front transition sub-section 332 and the rear barrel 118 is coupled to the back end 344 of the rear transition sub-section 340 (block 708).

In one or more embodiments, the front-barrel diameter 314 is the same as the rear-barrel diameter 326. In one or more embodiments, the transition-barrel diameter 320 is the same as the front-barrel diameter 314 and/or the rear-barrel diameter 326.

In one or more embodiments, the transition frame 114 is coupled to the transition barrel 112, the front frame 108 and the rear frame 116. The transition frame 114 may be a full frame or a partial frame or it may not be present, as discussed above.

In one aspect, a tank trailer includes a front section. The front section has a front frame having a front-frame front end and a front-frame rear end. The front-frame front end is at a front-frame height above a surface upon which the tank trailer rests. The front section includes a cylindrical front barrel coupled to the front frame, wherein the front barrel has a front-barrel diameter and a front-barrel length. The tank trailer includes a rear section. The rear section includes a rear frame having a rear-frame front end and a rear-frame rear end. The rear-frame rear end is at a rear-frame height above the surface. The rear section includes a cylindrical rear barrel coupled to the rear frame. The rear barrel has a rear-barrel diameter and a rear-barrel length. The tank trailer includes a transition section. The transition section has a cylindrical transition barrel. The transition barrel has a transition-barrel diameter and a transition-barrel length along a transition-barrel height. The transition section includes a front transition sub-section having a shape of a cylinder having a front end and a back end. The front end is at an acute transition-non-right angle to the transition-barrel height and is coupled to the cylindrical front barrel. The back end is at a right angle to the transition barrel height and is coupled to the cylindrical transition barrel. The transition section includes a rear transition sub-section having a shape of a cylinder having a front end and a back end. The back end is at the acute transition-non-right angle to the transition-barrel height and is coupled to the cylindrical rear barrel. The front end is at a right angle to the transition barrel height and is coupled to the cylindrical transition barrel. The front-barrel diameter is the same as the rear-barrel diameter.

Implementations may include one or more of the following. The transition-barrel diameter may be the same as the front-barrel diameter. The transition section may include a transition frame coupled to the transition barrel, the front frame, and the rear frame. The transition frame may have a transition-frame length that is greater than ¼ the transition-barrel length and less than ¾ the transition-barrel length. The front barrel may have the shape of a cylinder having a front-barrel front end, a front-barrel rear end, and a front-barrel height. The front-barrel rear end may be at an acute front-non-right angle to the front-barrel height. The rear barrel may have the shape of a cylinder having a rear-barrel front end, a rear-barrel rear end, and a rear-barrel height. The rear-barrel front end may be at an acute rear-non-right angle to the rear-barrel height. The front barrel may have a front-barrel inside diameter and a top of the front-barrel inside diameter. The rear barrel may have a rear-barrel inside diameter and a top of the rear-barrel inside diameter. The top of the front-barrel inside diameter may be at a greater distance from the surface than the top of the rear-barrel inside diameter by at least 10 percent of the front-barrel diameter. The tank trailer may include a king pin coupled to the front section. The front-barrel length may be the smallest that can be achieved while providing a swing clearance around the king pin and while using standard sheet metal widths to construct the front barrel. The front frame may have a front-frame length that is greater than ¼ the front-barrel length and less than ¾ the front-barrel length. The rear frame may have a rear-frame length that is greater than ¼ the rear-barrel length and less than ¾ the rear-barrel length.

In one aspect, a method includes constructing a front section. The front section is constructed by manufacturing a front frame having a front-frame front end and a front-frame rear end. The front-frame front end is designed to be at a front-frame height above a surface upon which the tank trailer rests. Constructing the front section includes manufacturing a cylindrical front barrel having a front-barrel diameter and a front barrel length. Constructing the front section includes coupling the front barrel to the front frame. The method includes constructing a rear section. Constructing the rear section includes manufacturing a rear frame having a rear-frame front end and a rear-frame rear end. The rear-frame rear end is designed to be at a rear-frame height above the surface. Constructing the rear section includes manufacturing a cylindrical rear barrel having a rear-barrel diameter and a rear barrel length. Constructing the rear section includes coupling the rear barrel to the rear frame. The method includes constructing a transition section. Constructing the transition section includes manufacturing a cylindrical transition barrel having a transition-barrel diameter and a transition-barrel length along a transition-barrel height. Constructing the transition section includes manufacturing a front transition sub-section having a shape of a cylinder having a front end and a back end. The front end is at an acute transition-non-right angle to the transition-barrel height and the back end is at a right angle to the transition-barrel height and is coupled to the cylindrical transition barrel. Constructing the transition section includes manufacturing a rear transition sub-section having a shape of a cylinder having a front end and a back end. The back end is at the transition-non-right angle to the transition-barrel height and the front end is at a right angle to the transition-barrel height and is coupled to the cylindrical transition barrel. The method includes coupling the front barrel to the front end of the front transition sub-section and coupling the rear barrel to the back end of the rear transition sub-section. The front-barrel diameter is the same as the rear-barrel diameter.

Implementations may include one or more of the following. The transition-barrel diameter may be the same as the front-barrel diameter. The method may include coupling a transition frame to the transition barrel, the front frame and the rear frame.

In one aspect, a tank trailer includes a front section. The front section has a front frame having a front-frame front end and a front-frame rear end. The front-frame front end is at a front-frame height above a surface upon which the tank trailer rests. The front section includes a cylindrical front barrel coupled to the front frame. The front barrel has a front-barrel diameter and a front barrel length. The tank trailer includes a rear section. The rear section has a rear frame having a rear-frame front end and a rear-frame rear end. The rear-frame rear end is at a rear-frame height above the surface. The rear section includes a cylindrical rear barrel coupled to the rear frame. The rear barrel has a rear-barrel diameter and a rear barrel length. The tank trailer includes a transition section. The transition section includes a cylindrical transition barrel coupled to the front barrel and to the rear barrel. The transition barrel has a transition-barrel diameter and a transition-barrel length along a transition-barrel height. The front-barrel diameter is the same as the rear-barrel diameter.

Implementations may include one or more of the following. The transition-barrel diameter may be the same as the front-barrel diameter. The transition section may include a transition frame coupled to the transition barrel, the front frame, and the rear frame. The front barrel may have a front-barrel inside diameter and a top of the front-barrel inside diameter. The rear barrel may have a rear-barrel inside diameter and a top of the rear-barrel inside diameter. The top of the front-barrel inside diameter may be at a greater distance from the surface than the top of the rear-barrel inside diameter by at least 10 percent of the front-barrel diameter. The front section may have a front-section length. A king pin may be coupled to the front section. The front-length may be the smallest that can be achieved while providing a swing clearance around the king pin and while using standard sheet metal widths to construct the front section. The front frame may have a front-frame length that is greater than ¼ the front barrel length and less than ¾ the front barrel length. The rear frame may have a rear-frame length that is greater than ¼ the rear barrel length and less than ¾ the rear barrel length.

The word "coupled" herein means a direct connection or an indirect connection.

The text above describes one or more specific embodiments of a broader invention. The invention also is carried out in a variety of alternate embodiments and thus is not limited to those described here. The foregoing description of an embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A tank trailer comprising:
   a front section having:
      a front frame having a front-frame front end and a front-frame rear end, wherein the front-frame front end is at a front-frame height above a surface upon which the tank trailer rests, and
      a cylindrical front barrel coupled to the front frame, wherein the front barrel has a front-barrel diameter and a front-barrel length;
   a rear section having:
      a rear frame having a rear-frame front end and a rear-frame rear end, wherein the rear-frame rear end is at a rear-frame height above the surface,
      a cylindrical rear barrel coupled to the rear frame, wherein the rear barrel has a rear-barrel diameter and a rear-barrel length;
   a transition section having:
      a cylindrical transition barrel, wherein the transition barrel has a transition-barrel diameter and a transition-barrel length along a transition-barrel height,
      a front transition sub-section having a shape of a cylinder having a front end and a back end wherein the front end is at an acute transition-non-right angle to the transition-barrel height and is coupled to the cylindrical front barrel and the back end is at a right angle to the transition barrel height and is coupled to the cylindrical transition barrel,
      a rear transition sub-section having a shape of a cylinder having a front end and a back end wherein the back end is at the acute transition-non-right angle to the transition-barrel height and is coupled to the cylindrical rear barrel and the front end is at a right angle to the transition barrel height and is coupled to the cylindrical transition barrel;
   wherein:
      the front-barrel diameter is the same as the rear-barrel diameter.

2. The tank trailer of claim 1 wherein the transition-barrel diameter is the same as the front-barrel diameter.

3. The tank trailer of claim 1 wherein the transition section further comprises a transition frame coupled to the transition barrel, the front frame, and the rear frame.

4. The tank trailer of claim 3 wherein the transition frame has a transition-frame length that is greater than ¼ the transition-barrel length and less than ¾ the transition-barrel length.

5. The tank trailer of claim 1 wherein:
the front barrel has the shape of a cylinder having a front-barrel front end, a front-barrel rear end, and a front-barrel height; and
wherein the front-barrel rear end is at an acute front-non-right angle to the front-barrel height.

6. The tank trailer of claim 1 wherein:
the rear barrel has the shape of a cylinder having a rear-barrel front end, a rear-barrel rear end, and a rear-barrel height; and
wherein the rear-barrel front end is at an acute rear-non-right angle to the rear-barrel height.

7. The tank trailer of claim 1 wherein:
the front barrel has a front-barrel inside diameter and a top of the front-barrel inside diameter;
the rear barrel has a rear-barrel inside diameter and a top of the rear-barrel inside diameter; and
the top of the front-barrel inside diameter is at a greater distance from the surface than the top of the rear-barrel inside diameter by at least 10 percent of the front-barrel diameter.

8. The tank trailer of claim 1 wherein:
a king pin is coupled to the front section; and
the front-barrel length is the smallest that can be achieved while providing a swing clearance around the king pin and while using standard sheet metal widths to construct the front barrel.

9. The tank trailer of claim 1 wherein the front frame has a front-frame length that is greater than ¼ the front-barrel length and less than ¾ the front-barrel length.

10. The tank trailer of claim 1 wherein the rear frame has a rear-frame length that is greater than ¼ the rear-barrel length and less than ¾ the rear-barrel length.

11. A method comprising:
constructing a front section by:
manufacturing a front frame having a front-frame front end and a front-frame rear end, wherein the front-frame front end is designed to be at a front-frame height above a surface upon which the tank trailer rests,
manufacturing a cylindrical front barrel having a front-barrel diameter and a front barrel length, and
coupling the front barrel to the front frame;
constructing a rear section by:
manufacturing a rear frame having a rear-frame front end and a rear-frame rear end, wherein the rear-frame rear end is designed to be at a rear-frame height above the surface,
manufacturing a cylindrical rear barrel having a rear-barrel diameter and a rear barrel length, and
coupling the rear barrel to the rear frame;
constructing a transition section by:
manufacturing a cylindrical transition barrel having a transition-barrel diameter and a transition-barrel length along a transition-barrel height,
manufacturing a front transition sub-section having a shape of a cylinder having a front end and a back end wherein the front end is at an acute transition-non-right angle to the transition-barrel height and the back end is at a right angle to the transition-barrel height and is coupled to the cylindrical transition barrel, and
manufacturing a rear transition sub-section having a shape of a cylinder having a front end and a back end wherein the back end is at the transition-non-right angle to the transition-barrel height and the front end is at a right angle to the transition-barrel height and is coupled to the cylindrical transition barrel;
coupling the front barrel to the front end of the front transition sub-section; and
coupling the rear barrel to the back end of the rear transition sub-section;
wherein:
the front-barrel diameter is the same as the rear-barrel diameter.

12. The method of claim 11 wherein the transition-barrel diameter is the same as the front-barrel diameter.

13. The method of claim 11 further comprising coupling a transition frame to the transition barrel, the front frame and the rear frame.

14. A tank trailer comprising:
a front section having:
a front frame having a front-frame front end and a front-frame rear end, wherein the front-frame front end is at a front-frame height above a surface upon which the tank trailer rests, and
a cylindrical front barrel coupled to the front frame, wherein the front barrel has a front-barrel diameter and a front barrel length;
a rear section having:
a rear frame having a rear-frame front end and a rear-frame rear end, wherein the rear-frame rear end is at a rear-frame height above the surface, wherein the front-frame height is not at the same height as the rear-frame height,
a cylindrical rear barrel coupled to the rear frame, wherein the rear barrel has a rear-barrel diameter and a rear barrel length;
a transition section having:
a cylindrical transition barrel coupled to the front barrel and to the rear barrel, wherein the transition barrel has a transition-barrel diameter and a transition-barrel length along a transition-barrel height,
wherein:
the front-barrel diameter is the same as the rear-barrel diameter; and
the transition-barrel diameter is the same as the front-barrel diameter.

15. The tank trailer of claim 14 wherein the transition section further comprises a transition frame coupled to the transition barrel, the front frame, and the rear frame.

16. The tank trailer of claim 14 wherein:
the front barrel has a front-barrel inside diameter and a top of the front-barrel inside diameter;
the rear barrel has a rear-barrel inside diameter and a top of the rear-barrel inside diameter; and
the top of the front-barrel inside diameter is at a greater distance from the surface than the top of the rear-barrel inside diameter by at least 10 percent of the front-barrel diameter.

17. The tank trailer of claim 14 wherein:
the front section has a front-section length;
a king pin is coupled to the front section; and the front-length is the smallest that can be achieved while providing a swing clearance around the king pin and while using standard sheet metal widths to construct the front section.

18. The tank trailer of claim 14 wherein the front frame has a front-frame length that is greater than ¼ the front barrel length and less than ¾ the front barrel length.

19. The tank trailer of claim 14 wherein the rear frame has a rear-frame length that is greater than ¼ the rear barrel length and less than ¾ the rear barrel length.

* * * * *